R. O. BRIGHT & C. D. SMITH.
SHAFT JOINT AND METHOD OF FORMING THE SAME.
APPLICATION FILED JUNE 17, 1918.
1,291,388.
Patented Jan. 14, 1919
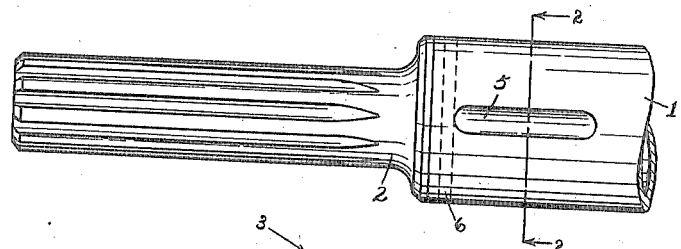
Fig. I.
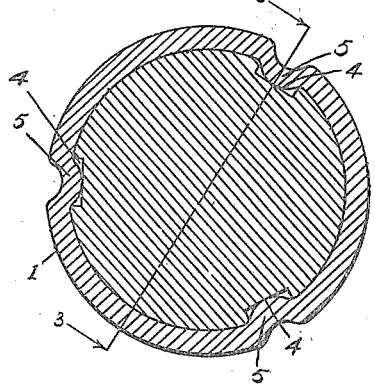
Fig. II.
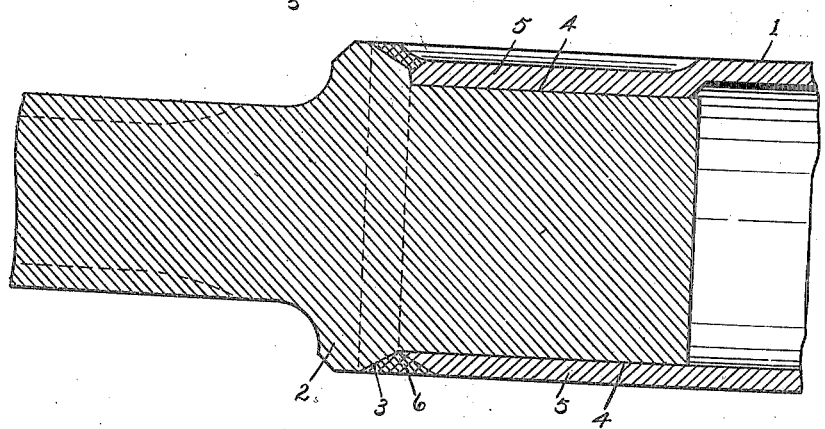
Fig. III.
Inventor
ROBERTS O. BRIGHT
CHARLES D. SMITH
Witnesses
Lenn Gilman
Annie E. Parry.
By Chappell Earl
Attorneys

UNITED STATES PATENT OFFICE.

ROBERTS O. BRIGHT AND CHARLES D. SMITH, OF ANDERSON, INDIANA, ASSIGNORS TO ARVAC MANUFACTURING COMPANY, OF ANDERSON, INDIANA.

SHAFT-JOINT AND METHOD OF FORMING THE SAME.

1,291,388.

Specification of Letters Patent. Patented Jan. 14, 1919.

Application filed June 17, 1918. Serial No. 240,338.

*To all whom it may concern:*

Be it known that we, ROBERTS O. BRIGHT and CHARLES D. SMITH, citizens of the United States, residing at Anderson, county of Madison, State of Indiana, have invented certain new and useful Improvements in Shaft-Joints and Methods of Forming the Same, of which the following is a specification.

This invention relates to improvements in shaft joints and method of forming the same.

Our improvements are especially designed by us for uniting the propeller shaft of an automobile to a shaft stub for a universal joint and we have illustrated our improvements in one form used in that relation. Our improvements are, however, desirable for use in other relations where it is desired to join a tubular shaft or propeller to a shaft stub, the term shaft stub being used to designate the part joined to the tubular shaft.

The main object of our invention is to provide an improved shaft joint which is simple and economical to produce and at the same time one which is very strong and secure, there being no parts such as separate keys to work loose.

Further objects, and objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing, forming a part of this specification, in which:

Figure I is a side view of a structure embodying the features of our invention, the tubular shaft or propeller being partially broken away.

Fig. II is a cross section on a line corresponding to line 2—2 of Fig. I.

Fig. III is a detail longitudinal section on a line corresponding to line 3—3 of Fig. II.

In the drawing similar reference characters refer to similar parts throughout the several views, and the sectional views are taken looking in the direction of the little arrows at the ends of the section lines.

Referring to the drawing, 1 represents a tubular shaft and 2 the shaft stub of a universal joint, its relation to the joint being illustrated in Letters Patent #1,263,748, dated April 23, 1918.

The shaft stub 2 is formed with an annular shoulder 3, preferably beveled as illustrated, and with longitudinal grooves 4, the shoulder being at the inner end of the grooves. The shaft 1 is of such dimensions as to be sleeved upon the shaft stub.

In assembling the shaft 1 is heated, sleeve upon the stub, and swaged into the grooves to provide integral groove engaging keys 5. This swaging is preferably done by placing in a hydraulic press having three grips which force the material of the tube to the bottoms of the key-ways, providing, in effect, integral keys, the structure illustrated having three uniformly spaced grooves and coacting keys. In cooling, the tubular shaft contracts upon the shaft stub, making a very secure connection.

To further reinforce and secure the joint the end of the shaft 1 is welded at 6 upon the beveled shoulder. This is preferably, and as we have practised our invention, an acetylene or an electric arc weld securing a fusing weld of the parts entirely around the joint. The joint thus formed is not only very simple and economical to produce but is very secure and has the further advantage of an attractive appearance.

We have illustrated our improvements as we have embodied the same in joining a shaft to a universal joint shaft stub. Our improvements, as stated, are capable of adaptation in various relations which we have not attempted to illustrate, as we believe the disclosure made will enable those skilled in the art to which this invention relates to embody or adapt the same as may be desired.

Having thus described our invention, what we claim as new and desire to secure by Letters Patent, is:

1. A shaft joint comprising a shaft stub having longitudinal grooves therein and a beveled annular shoulder at the inner end of the grooves, and a tubular shaft sleeved upon said shaft stub and having portions swaged into its said grooves providing a plurality of integral keys, the end of the shaft being fuse welded upon said shoulder.

2. A shaft joint comprising a shaft stub having longitudinal grooves therein and an annular shoulder at the inner end of the grooves, and a tubular shaft sleeved upon said shaft stub and having portions swaged into its said grooves providing a plurality of integral keys, the end of the shaft being welded upon said shoulder.

3. A shaft joint comprising a shaft stub having longitudinal grooves therein, and a tubular shaft sleeved upon said shaft stub and having portions swaged into its said grooves providing a plurality of integral keys, the end of the shaft being welded to said stub.

4. The method of uniting a shaft stub and a tubular shaft consisting of forming the shaft stub with longitudinal grooves and a beveled annular shoulder at the inner end of the grooves, heating the tube and sleeving upon the shaft stub, and swaging the tube into the grooves of the stub and fuse welding the inner end of the tube to the beveled shoulder.

5. The method of uniting a shaft stub and a tubular shaft consisting of forming the shaft stub with longitudinal grooves and an annular shoulder at the inner end of the grooves, heating the tube and sleeving upon the shaft stub, and swaging the tube into the grooves of the stub and welding the inner end of the tube to the shoulder.

6. The method of uniting a shaft stub and a tubular shaft consisting of forming the shaft stub with longitudinal grooves, heating the tube and sleeving upon the shaft stub, and swaging the tube into the grooves of the stub and welding the inner end of the tube to the shaft stub.

In witness whereof we have hereunto set our hands and seals in the presence of two witnesses.

ROBERTS O. BRIGHT. [L. S.]
CHARLES D. SMITH. [L. S.]

Witnesses:
EVELYN I. KRUG,
PEARL A. SOULE.